US012524650B2

(12) United States Patent
Andalman

(10) Patent No.: US 12,524,650 B2
(45) Date of Patent: Jan. 13, 2026

(54) EFFICIENT CROSS-PLATFORM SERVING OF DEEP NEURAL NETWORKS FOR LOW LATENCY APPLICATIONS

(71) Applicant: Cognitiv Corp., New York, NY (US)

(72) Inventor: Aaron Andalman, Berkeley, CA (US)

(73) Assignee: Cognitiv Corp., New York, NY (US)

( * ) Notice: Subject to any disclaimer, the term of this patent is extended or adjusted under 35 U.S.C. 154(b) by 802 days.

(21) Appl. No.: 17/839,252

(22) Filed: Jun. 13, 2022

(65) Prior Publication Data

US 2022/0398433 A1 Dec. 15, 2022

Related U.S. Application Data

(60) Provisional application No. 63/210,635, filed on Jun. 15, 2021.

(51) Int. Cl.
*G06N 3/044* (2023.01)
(52) U.S. Cl.
CPC .................... *G06N 3/044* (2023.01)
(58) Field of Classification Search
CPC .................................................. G06N 3/044
See application file for complete search history.

(56) References Cited

U.S. PATENT DOCUMENTS

| 10,671,908 B2 | 6/2020 | Simard | |
|---|---|---|---|
| 11,704,299 B1 * | 7/2023 | Bansal | G06F 16/907 |
| | | | 707/802 |
| 2005/0193414 A1 * | 9/2005 | Horvitz | H04N 21/47 |
| | | | 725/89 |
| 2018/0168515 A1 | 6/2018 | Farahmand et al. | |
| 2019/0279100 A1 | 9/2019 | Cline | |
| 2019/0332952 A1 | 10/2019 | Nonaka et al. | |
| 2020/0226675 A1 * | 7/2020 | Mitra | G06N 3/084 |
| 2020/0310540 A1 | 10/2020 | Hussami et al. | |
| 2021/0073995 A1 | 3/2021 | Yang et al. | |

(Continued)

FOREIGN PATENT DOCUMENTS

| EP | 3627399 A1 | 3/2019 |
|---|---|---|
| WO | 2020245936 A1 | 12/2020 |

OTHER PUBLICATIONS

European Patent Office; "Extended European Search Report" dated Mar. 13, 2025; EP Patent Application No. 22825633.5; pp. 1-10 (2025).

(Continued)

*Primary Examiner* — David E Choi
(74) *Attorney, Agent, or Firm* — Alan D. Minsk; FisherBroyles LLP

(57) ABSTRACT

Systems, apparatuses, and methods for implementation of an inference or prediction process using a recurrent neural network (RNN) that is particularly advantageous for low-latency applications. Embodiments introduce an implementation of a recurrent neural network-based system which results in a fixed inference time (i.e., a constant computation time to perform an inference stage) that is independent of input data sequence length. Embodiments may be used to implement real-time data mapping and management and perform an inference strategy that enables the system to be used for serving different types of models, including sequential deep neural networks for low latency (i.e., real-time, or close to real-time) applications.

17 Claims, 7 Drawing Sheets

(56) References Cited

U.S. PATENT DOCUMENTS

| | | | |
|---|---|---|---|
| 2022/0039756 A1* | 2/2022 | Mikhno | A61B 5/14532 |
| 2022/0292339 A1* | 9/2022 | Byrne | G06N 3/044 |
| 2022/0391459 A1* | 12/2022 | Lim | G06F 16/9538 |
| 2022/0398433 A1* | 12/2022 | Andalman | G06Q 10/067 |

OTHER PUBLICATIONS

Gharibshah Zhabiz et al.: "Deep Learning for User Interest and Response Prediction in Online Display Advertising", Data Science and Engineering, [Online] vol. 5, No. 1, Jan. 17, 2020 (Jan. 17, 2020), pp. 12-26, XP055893760, ISSN: 2364-1185, DOI:10.1007/s41019-019-00115-y; Retrieved from the Internet: URL: https://link.springer.com/content/pdf/10.1007/s41019-019-00115-y.pdf>[retrieved on Feb. 28, 2025] (2020).

International Searching Authority of the PCT (US); "Notification of Transmittal of the International Search Report and the Written Opinion of the International Searching Authority, or the Declaration" dated Oct. 14, 2022; PCT Application No. PCT/US22/33360; pp. 1-10 (2022).

Hazelwood et al., "Applied Machine Learning at Facebook: A Datacenter Infrastructure Perspective"; Published in: 2018 IEEE International Symposium on High Performance Computer Architecture (HPCA); Date of Conference: Feb. 24-28, 2018; retrieved on [Sep. 25, 2022]; retrieved from the internet <URL: https://ieeexplore.ieee.org/starnp/stamp.jsp?tp=&arnumber-8327042> entire document.

Shea et al., "Heterogeneous Scheduling of Deep Neural Networks for Low-power Real-time Designs"; ACM Journal on Emerging Technologies in Computing Systems; vol. 15; Issue 4; Oct. 2019; Article No. 36; pp. 1-31; Online:Dec. 16, 2019; retrieved on [Sep. 25, 2022]; retrieved from the internet <URL: https://dl.acm.org/doi/pdf/10.1145/3358699> entire document.

Neil; Thesis submitted to attain the degree of Doctor of Sciences of Eth Zurich; PhD diss. 24392; University of Zurich; "Deep Neural Networks and Hardware Systems for Event-driven Data"; pp. 1-154 (2017).

Graves et al.; "Improving neural language models with a continuous cache"; Facebook AI Research; arXiv preprint arXiv:1612.04426; Dec. 13, 2016; pp. 1-9.

\* cited by examiner

EFFICIENT CROSS-PLATFORM SERVING OF DEEP NEURAL NETWORKS FOR LOW LATENCY APPLICATIONS

CROSS REFERENCE TO RELATED APPLICATION

This application claims the benefit of U.S. Provisional Application No. 63/210,635, entitled "Efficient Cross-Platform Serving of Deep Neural Networks for Low Latency Applications," filed Jun. 15, 2021, the disclosure of which is incorporated in its entirety by this reference.

BACKGROUND

Using deep neural networks (DNN) as part of an inference or prediction pipeline in production systems is a challenging task. There are multiple concerns that need to be addressed in designing and implementing an inference serving system. These typically include (but are not limited to) a strategy for storage and retrieval of data, determining the frequency of predictions, the number of models that will be served, latency requirements of the application or task for which the models are being used, how to scale the system with changes in demand, ensuring robust and consistent deployment, providing continuous monitoring for prediction failures, and how best to deploy new or updated models.

For low latency applications (such as those requiring inference results be available within a period on the scale of 10 milliseconds) and that have high demand (e.g., needing to have available hundreds of thousands of inferences per second for tens of models), the value and need for an efficient system is increased even further. In such applications, it is critical to optimally use resources such as memory, CPU cycles, or time, and each step in the inference pipeline should be carefully considered and efficiently implemented.

Recurrent Neural Networks (RNN) are a powerful sequence modeling approach in machine learning and are often used for modeling temporal or sequential data streams. However, the high model capacity and accurate prediction capability of an RNN often comes at the expense of training and inference time, making RNNs a challenge for use in low-latency applications.

An RNN receives sequences of time-ordered data points and computes hidden representations for each time step to make a prediction or inference. In conventional approaches, the RNN goes through an entire sequence of input data and performs a constant time operation for each datapoint. Therefore, the computational complexity of a recurrent neural network scales linearly with the length of the input sequence, that is, it is on the order of (n) (O(n)), where n is the length of the input sequence. However, to use a recurrent neural network effectively in a low-latency application, the computational complexity of the inference process is preferably a constant value and independent of input sequence length (n), that is it is on the order of a constant, $O(1)$[1]. If achievable, this results in an inference process that requires a fixed and constant amount of computational time and is independent of the length of an input data sequence for an inference or prediction process.

[1] A computation time that scales as O (1) means that it takes a constant time (e.g., 14 nanoseconds) regardless of the amount of data in the input dataset. In contrast, an O (n) means it takes an amount of time that scales linearly with the size of the set, so a set twice the size will take twice the computation time.

Embodiments are directed to overcoming one or more disadvantages associated with conventional approaches to implementing and using RNNs for the processing of sequenced or temporal data streams, both individually and collectively.

SUMMARY

The terms "invention," "the invention," "this invention," "the present invention," "the present disclosure," or "the disclosure" as used herein are intended to refer broadly to all the subject matter disclosed in this document, the drawings or figures, and to the claims. Statements containing these terms do not limit the subject matter disclosed or the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

Embodiments disclosed herein are directed to systems, apparatuses, and methods for the design and implementation of an efficient and robust system/platform for the serving of deep neural networks or models based on such networks, and more specifically, for the serving of such neural networks for use in low latency applications. Embodiments introduce a design and implementation of a neural network serving system and methodology that can be used to host a variety of models (such as trained machine learning models) while providing a near real-time prediction latency and a more optimal use of resources.

In some embodiments, the disclosure is directed to systems, apparatuses, and methods for implementation of an inference or prediction process using a recurrent neural network that is particularly advantageous for low-latency applications. The embodiments disclosed herein introduce an implementation of a recurrent neural network-based system which results in a fixed inference time (i.e., a constant computation time to perform an inference stage) that is independent of input data sequence length. Embodiments may be used to implement real-time data mapping and management and perform an inference strategy that enables the system to be used for serving different types of models, including sequential deep neural networks (such as recurrent neural networks) for low latency (i.e., real-time, or close to real-time) applications.

In some embodiments, the disclosure introduces an approach for implementing the inference phase for an application or task using a recurrent neural network (RNN). The disclosed implementation includes capabilities for managing and coordinating both an offline and an online prediction process at the time an inference operation is performed. The disclosed approach makes RNNs usable for inference processes in low-latency applications where data points are received over an extended period of time. Further, embodiments represent an implementation of a RNN and related processing stages that make it possible to perform an inference or prediction stage in a constant (fixed) amount of time for each inference operation.

In one example of an embodiment, an implementation of the disclosed method may comprise the following set or sequence of steps, stages, functions, operations, or processes:

Receive a business task, such as a bid request, at a business API;
  A bid request is a piece of code used to sell display ads and inventory details (bid requests are a component of programmatic advertising as they allow publishers and advertisers to exchange and utilize user and contextual information to serve up the "best" ad content to a viewer);
    The code is executed when a visitor loads a web page (with ad spaces on it). A function of a bid request is to record and present data relating to the viewer/user and the device that he/she is operating. By doing this, the bid request can fetch more relevant ads via the ad networks and display them to the visitor to the web page;
  As an example, the "request" may comprise a set of data generated by or related to a viewer that serves as an input to a model trained to "predict" the viewer's subsequent action or reaction to an advertisement (which may be a factor in the selection of content to present to a viewer or the resources invested in placing the advertisement on a web page being viewed);
    This can be of value to an advertiser or ad exchange in determining what ad content to present based on the web page visitor's/viewer's expected behavior;
In some embodiments, the API may be associated with a SaaS platform or a specific account accessible from such a platform, where the platform "hosts" and allows access to one or more trained models to execute a prediction or inference process;
A Machine Learning (ML) Gateway (or a SaaS platform operating in a similar manner and able to perform similar functions) functions as an interface and a task or operation coordinator. For example, when a user/viewer identifier (ID) is determined, the ML gateway may execute logic that determines what operations to perform for that user. As examples, ML Gateway may perform one or more functions or services including:
  Look up a user identifier (ID) and determine if there are features stored for that user in a database (for example, the previously cached hidden states and/or a data representation resulting from a previous iteration of a model). If the result is that features are stored, then the process retrieves them. If the result is that features are not stored, then the request is rejected;
    As noted, the stored features may include one or more of a hidden state of a previously executed model and/or a representation of a data point used as an input to a model;
      The data point may be a representation of a user/viewer's features that serves as an input to a trained model;
  Aggregate the retrieved features (this may occur in the situation of having multiple types or sets of features, such as demographics or browsing history, for example);
    As an example, the features may include demographic information about a user/viewer, information about their device, and additional information that may be used to evaluate their likely behavior (browsing history, purchasing history, or submitted queries regarding a topic, as examples);
  Provide the aggregated retrieved user features (and/or the retrieved cached hidden states if those can be utilized) to one or more deployed models;
    A Prediction Server may host or provide access to one or more trained models, where each such model operates to:
      Generate a data representation and hidden layers of a neural network or other model as it is configured from an iteration or "cycle"; and
      Uses the retrieved features as inputs to the neural network or other form of model to generate an output representing a prediction or inference as to the user's/viewer's behavior;
  Obtain the generated model output(s) from Prediction Server (the hosted model or models) and provide them to the business API, from which it may be accessed by an entity or process;
  The hidden states (e.g., layers) and/or data representation of the newly executed model or models may be accessed and stored (or cached) in a database for later use in another iteration of the inference/prediction process; and
  The request, the output prediction, and other relevant data or metadata may be stored in a log or journal and associated with the user ID.

In one embodiment, the disclosure is directed to a system, where the system may include a set of computer-executable instructions contained in a data storage element, and an electronic processor or co-processors. When executed by the processor or co-processors, the instructions cause the processor or co-processors (or a device of which they are part) to perform a set of operations that implement an embodiment of the disclosed method or methods.

In one embodiment, the disclosure is directed to a set of computer-executable instructions, wherein when the set of instructions are executed by an electronic processor or co-processors, the processor or co-processors (or a device of which they are part) perform a set of operations that implement an embodiment of the disclosed method or methods.

In some embodiments, the systems and methods disclosed herein may provide services through a SaaS or multi-tenant platform. The platform provides access to multiple entities, each with a separate account and associated data storage. Each account may correspond to a user, set of users, an entity, a set or category of entities, a set or category of users, a set or category of data, an industry, or an organization, for example. Each account may access one or more services, a set of which are instantiated in their account and which implement one or more of the methods or functions described herein.

Other objects and advantages of the systems, apparatuses, and methods disclosed will be apparent to one of ordinary skill in the art upon review of the detailed description and the included figures. Throughout the drawings, identical reference characters and descriptions indicate similar, but not necessarily identical, elements. While the embodiments disclosed or described herein are susceptible to various modifications and alternative forms, specific embodiments are shown by way of example in the drawings and will be described in detail herein. However, the exemplary or specific embodiments are not intended to be limited to the forms described. Rather, the present disclosure covers all modifications, equivalents, and alternatives falling within the scope of the appended claims.

BRIEF DESCRIPTION OF THE DRAWINGS

Embodiments of the disclosure will be described with reference to the drawings, in which.

DETAILED DESCRIPTION

Figure 1:
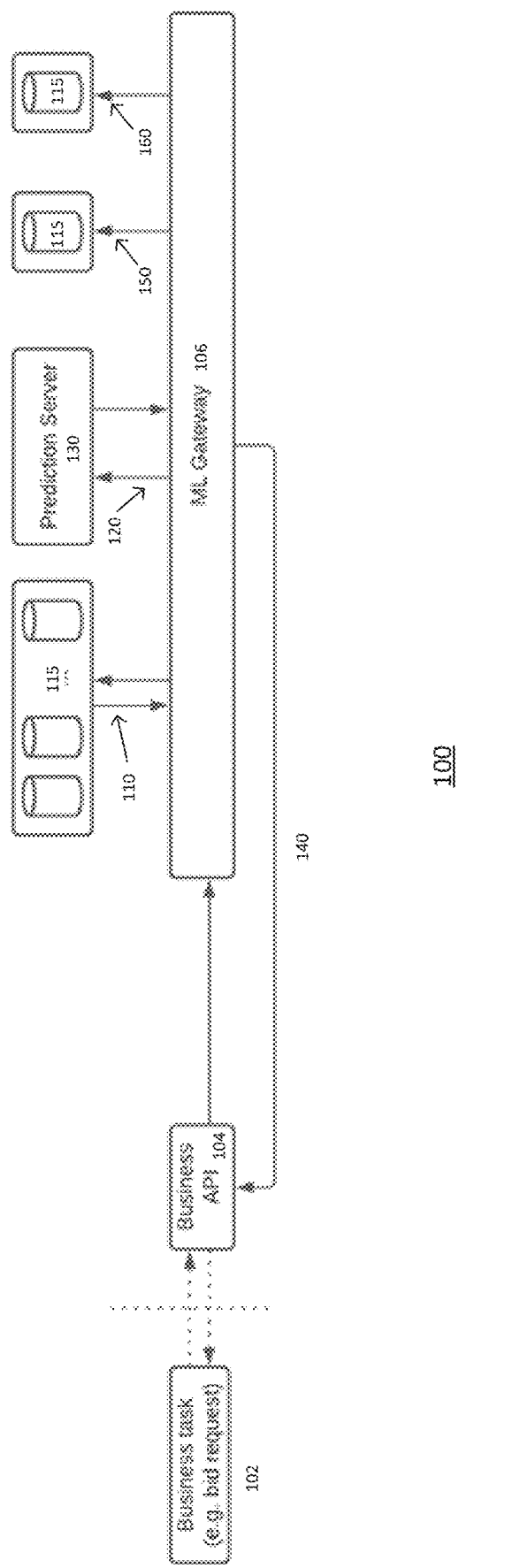
FIG. 1 is a diagram illustrating an overview of the components for a system to serve neural network models for low latency applications, in accordance with some embodiments.

One or more embodiments of the disclosed subject matter are described herein with specificity to meet statutory requirements, but this description does not limit the scope of the claims. The claimed subject matter may be embodied in other ways, may include different elements or steps, and may be used in conjunction with other existing or later developed technologies. The description should not be interpreted as implying any required order or arrangement among or between various steps or elements except when the order of individual steps or arrangement of elements is explicitly noted as being required.

Embodiments of the disclosed subject matter will be described more fully herein with reference to the accompanying drawings, which show by way of illustration, example embodiments by which the disclosed systems, apparatuses, and methods may be practiced. However, the disclosure may be embodied in different forms and should not be construed as limited to the embodiments set forth herein; rather, these embodiments are provided so that this disclosure will satisfy the statutory requirements and convey the scope of the disclosure to those skilled in the art.

Among other forms, the subject matter of the disclosure may be embodied in whole or in part as a system, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods described herein may be implemented by a suitable processing element or elements (such as a processor, microprocessor, CPU, GPU, TPU, QPU, state machine, or controller, as non-limiting examples) that are part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory data storage elements. In some embodiments, the set of instructions may be conveyed to a user over a network (e.g., the Internet) through a transfer of instructions or an application that executes a set of instructions.

In some embodiments, the systems and methods disclosed herein may provide services to end users through a SaaS or multi-tenant platform. The platform provides access to multiple entities, each with a separate account and associated data storage. Each account may correspond to a user, a set of users, an entity, a set or category of entities, a set or category of users, a set or category of data, an industry, or an organization, for example. Each account may access one or more services (such as applications or functionality), a set of which are instantiated in their account, and which implement one or more of the methods, process, operations, or functions disclosed herein.

In some embodiments, one or more of the operations, functions, processes, or methods disclosed herein may be implemented by a specialized form of hardware, such as a programmable gate array, application specific integrated circuit (ASIC), or the like. Note that an embodiment of the disclosed methods may be implemented in the form of an application, a sub-routine that is part of a larger application, a "plug-in", an extension to the functionality of a data processing system or platform, or other suitable form. The following detailed description is, therefore, not to be taken in a limiting sense.

In some embodiments, the disclosure is directed to systems, apparatuses, and methods for implementing an end-to-end system for serving a deep neural network that is used to perform an inference or prediction stage of an application that is executed or updated in real-time or near real-time. An application of an embodiment may be for purposes of engaging in a bidding process (sometimes referred to as "real-time bidding"), where the bidding may be for purposes of obtaining access to content, a right to present content (as in an advertisement), an opportunity, a license, an option, or being used as part of a decision process, such as the selection of content or determination of a next event to initiate, as non-limiting examples. An application of an embodiment may also be for the purposes of adding information to a bid request before that request is forwarded to another entity for consideration.

Embodiments are directed to a system and architecture that enables deployment and use of deep neural networks with improved speed, efficiency, consistency, and scaling compared to conventional approaches. The disclosed system and methods provide flexibility in the choice of modeling frameworks, allowing for multiple combinations of tools to be used in the training of deep neural networks, while more optimally using resources (such as memory and CPU) in the production stage. The result is a high performance, reliable, and stable deployment framework for neural network models, and an ability to enable an application to perform inference operations in near real-time. Embodiments implement a data mapping, management, and inference strategy that enables the system to be used for serving different types of models, including sequential deep neural networks (such as recurrent neural networks) for low latency applications.

FIG. 1 is a diagram illustrating an overview of the components for a system 100 to serve neural network models for low latency applications, in accordance with some embodiments. As shown in the figure, the model serving and inference processing flow for an example implementation may comprise the following steps, stages, operations, or functions:

A business task 102, such as a bid request, is received at a business API 104;
  A bid request is a piece of code used to sell display ads and inventory details (bid requests are a component of programmatic advertising as they allow publishers and advertisers to exchange and utilize user and contextual information to serve up the "best" ad content to a viewer);
    The code is executed when a visitor loads a web page (with ad spaces on it). A function of a bid request is to record and present data relating to the viewer/user and the device that he/she is operating. By doing this, the bid request can fetch more relevant ads via the ad networks and display them to the visitor to the web page;
  As an example, the "request" may comprise a set of data generated by or related to a viewer that serves as an input to a model trained to "predict" the viewer's subsequent action;
    This can be of value to an advertiser or ad exchange in determining what ad content to present based on the web page visitor's/viewer's expected behavior;
In some embodiments, the API may be associated with a SaaS platform or a specific account accessible from such a platform, where the platform (illustrated as Machine Learning (ML) Gateway 106 in the figure, as an example) "hosts" and allows access to one or more trained models (represented by models residing on Prediction Server 130 in the figure) to execute a prediction or inference process;
Machine Learning (ML) Gateway 106 (or a SaaS platform operating in a similar manner and able to perform similar functions) functions as an interface and a task or operation coordinator. For example, when a user/viewer identifier (ID) is determined, ML gateway 106 may execute logic that determines what operations to perform for that user. As examples, ML Gateway 106 may perform one or more functions or services including:
  Look up a user identifier (ID) and determine if there are features stored for that user in a database 115 (for example, the previously cached hidden states and/or a data representation resulting from a previous iteration of a model), as suggested by process 110. If the result is that features are stored, then the process retrieves them. If the result is that features are not stored, then the request is rejected;
    As noted, the stored features may include one or more of a hidden state of a previously executed model and/or a representation of a data point used as an input to a model;
      The data point may be a representation of a user/viewer's features that serves as an input to a trained model;
  Aggregate the retrieved features (this may occur in the situation of having multiple types or sets of features, such as demographics or browsing history, for example);
    As an example, the features may include demographic information about a user/viewer, information about their device, and additional information that may be used to evaluate their likely behavior (browsing history, purchasing history, or submitted queries regarding a topic, as examples);
      Features can be retrieved for more than just the User ID, for example for the URL on which an ad would appear (such as text or images), or information regarding the IP address (such as location or Internet Service Provider);
    Aggregation would typically involve reorder and concatenating the features into the order expected by the model (if the first input to a model is age, then the process makes sure the features are sorted so that this is the form of the input);
  Provide the aggregated retrieved user features (and/or the retrieved cached hidden states if those can be utilized) to one or more deployed models (as suggested by process 120 and Prediction Server 130);
    Prediction Server 130 is a server, platform, device, component, network element, or process that hosts or provides access to one or more trained models, where each such model operates to:
      Generate a data representation and hidden layers of a neural network model as it is configured from an iteration or "cycle"; and
      Uses the retrieved features as inputs to the neural network or other form of model to generate an output representing a prediction or inference as to the user's/viewer's behavior;
  Obtain the generated model output(s) from Prediction Server (the hosted model or models) 130 and provide them to the business API 104, as suggested by process 140, from which it may be accessed by an entity or process;
  The hidden states (e.g., layers) and/or data representation of the newly executed model or models may be accessed and stored (or cached) in database 115 for later use in another iteration of the inference/prediction process, as suggested by process 150; and
  The request, the output prediction, and other relevant data or metadata may be stored in a log or journal and associated with the user ID, as suggested by process 160.
As shown in FIG. 1, based on a unique identifier, data associated with that identifier (e.g., features) that are stored in a low latency key-value database (e.g., datastore 115 in the figure) may be retrieved and mapped into an efficient data format by a process executed on ML Gateway 106;
  The associated data may be part of a sequence or temporal stream of data;
  The "mapping" of the data may include processing such as mapping, filtering, transformation, conversion, or evaluating, as examples to prepare the data for use by a model or models;
  The features retrieved from the datastore may include a feature (data) representation for the latest data point for that user/ID and a hidden state or states of a trained model that were generated in a previous iteration (as suggested by step, stage, operation, or process 110 in the figure):
    As a non-limiting example, the feature (data) representation process described in U.S. Provisional Application No. 63/215,015, entitled "Multi-Task Attention Based Recurrent Neural Networks for Efficient Representation Learning," filed Jun. 25, 2021, and the contents of which is hereby incorporated in its entirety, may be used to generate one or more features used as part of training or using the model;
  The retrieved data is provided as an input to Prediction Server 130 for performing an inference or prediction process (as suggested by process 120);

In some embodiments, the system may "pin" optimally compressed versions of models into a CPU cache (or other form of fast retrieval memory) for more efficiently executing an inference process;

The "prediction" of the model is converted to a response/decision within Server 130 or Gateway 106 and sent back to the business API 104 for access by the user;

In some embodiments, the conversion is based on application of one or more business logic rules or criteria that are applied to the model output to determine the appropriate response or decision;

For example, in one scenario, the business logic might determine that the system should present specific content or refrain from presenting specific content when a score output by a model exceeds a threshold value set by business logic, a rule-set, a formula, or other model;

As an example, the conversion process can use the output of other models that execute in parallel with the Prediction Server Model (which may be an RNN) to determine the optimal response or decision;

The latest state(s) of the cached features are stored in a database 115 to be used in the next iteration of the prediction model (as suggested by process 150); and An entry of the bid request, prediction and other relevant metadata is stored in a database 115 (as suggested by process 160).

The data received from the business API is rarely ready to be consumed by an inference model and typically needs to be processed or augmented by additional data to become useable. To achieve low latency prediction times, one of the first tasks is to implement a capability for real-time retrieval of data that is used to augment the received data and/or a feature extraction system that computes features rapidly and without causing an undesirable delay in the inference process. In some embodiments, and depending on the deployed models and application requirements, the described system and processing capabilities may offer and support both approaches.

In some embodiments, the system and methods disclosed herein may pre-calculate features that augment the received data. Such features may be calculated offline and updated periodically. In some embodiments, there may be three levels of caching provided to enable fast retrieval of data:
an in-memory cache on the prediction server providing the fastest access;
a memory database off server, such as redis; or
a low latency NoSQL database off server, such as scylla, which provides sub-millisecond retrieval time.

Using the key (or other identifier) received at inference time, the system retrieves and collects relevant features and maps them to a serialization format that is suitable for performance sensitive applications. Using serialization enables direct access to data without parsing or unpacking and provides fast access without allocation of memory. In some embodiments, FlatBuffers software library is a suitable option for memory mapped data and to enable sufficiently fast retrieval.

In some embodiments, the retrieved "features" may comprise previously determined inference engine or model outputs derived from previously generated and processed user data, or URLs, for example. For example, such data may comprise one or more of age, gender, or educational level of users, where this data may be helpful in predicting an objective. Other data such as web browsing history or social media interactions may be useful in leveraging and better utilizing temporal user behavior.

Embodiments of the described system and methods enable deployment of sequential models that process data streams, where recurrent neural networks (RNNs) are an example of such models. In some examples, RNNs take as an input a sequence of time-ordered data points. As each element (data point) in the sequence is fed into the RNN, a hidden representation is computed and stored for use when the next data element is input to the model.

Figure 2:
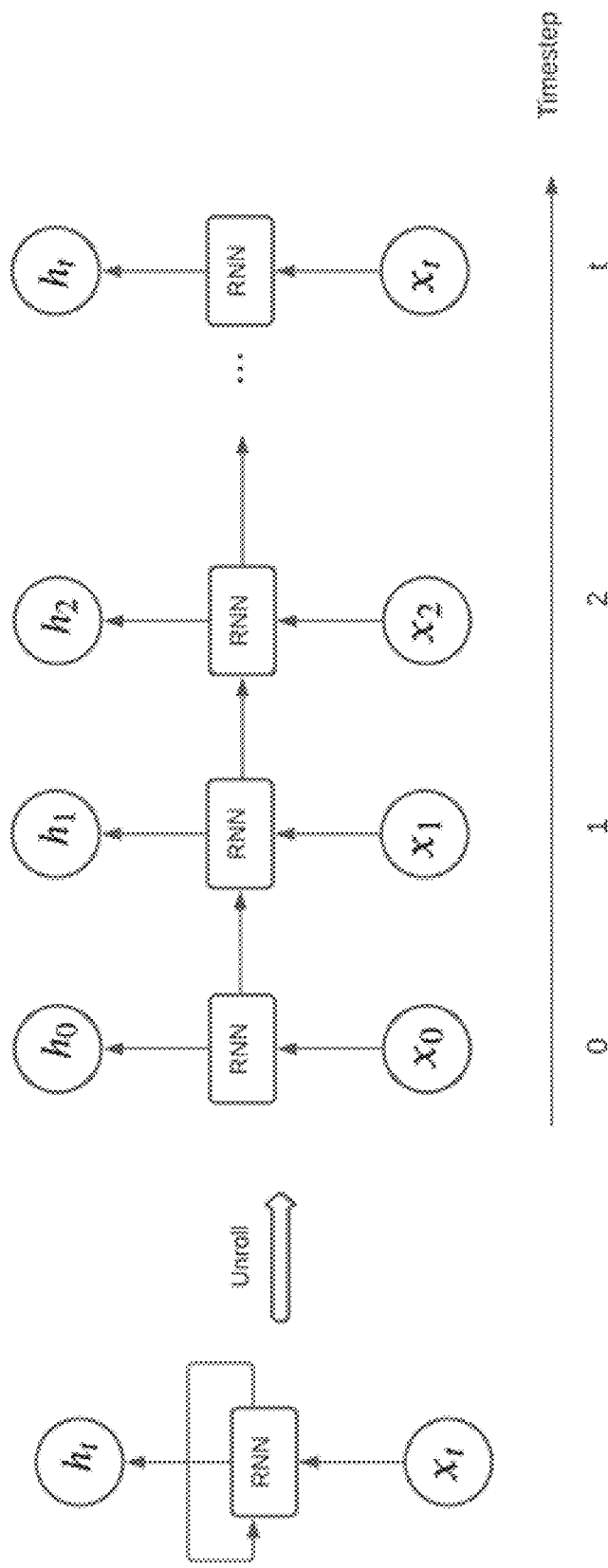
FIG. 2 is a diagram illustrating the unrolling of a recurrent neural network (RNN) in a time dimension, and assists in describing the data processing occurring in response to an input sequence.

FIG. 2 is a diagram illustrating the "unrolling" of a recurrent neural network (RNN) in a time dimension and assists in describing the data processing occurring in response to an input sequence. In one example implementation, for each element of the input sequence, the RNN performs a constant time operation or set of operations. As a result, the computational complexity (with regards to processing time) for an iteration of the RNN is linear with the length of the input sequence, that is of order O(n), where n is the length of the input sequence. This causes the computational resources required to perform each iteration of the model scale/increase with the size/length of the input sequence. As suggested by the figure, at each time step, (t, where t varies from 0 to t), input data X(t) (illustrated as $X_t$) is input to an RNN. The RNN accepts the input data and in return generates/outputs a value $h_t$, representing the "prediction", "inference", or other form of output of the RNN.

However, the conventional RNN behavior of the processing time for an iteration being O(n) may result in limiting the utility of such models to applications that are not as sensitive to latency in the inference stage and make them poorly suited for use in low-latency applications. Preferably, for a RNN (or other form of neural network or model) to be more desirable for use in a model, the computational complexity of an inference iteration should be a constant (fixed and independent of input length) amount of time, that is O(1).

This may create a disadvantage to using RNNs as the basis for an inference or prediction model. However, RNNs have an advantageous structure for use with time-sequence data. Therefore, it has been desirable to determine a methodology for using RNNs with time-sequence data in a low-latency application.

As disclosed herein and described further, work related to this disclosure has suggested that because for many RNN architectures the hidden state of the recurrent units at each timestep depends only on the prior elements of the sequence (as can be seen in the "unrolled" recurrent network in FIG. 2), a system can utilize an offline approach to calculate and cache the hidden state after all the sequence elements received up to the current time. Therefore, when a new element of the sequence is received in real-time, the prediction/output of the RNN can be computed with a computation time complexity that is constant because the RNN only has to be executed for one iteration—combining the cached hidden state with the new sequence element.

Thus, this caching system enables an RNN to produce predictions with a constant computation time when a new sequence element is received. This remains true as long as the average time between the arrival of each new element is greater than the constant time required to execute one iteration of the RNN. Thus, this caching system enables RNNs to be deployed in low-latency applications when sequential data is received with sufficient time between each element by allowing predictions to be computed with a constant time complexity that is independent of the input data sequence length.

To address and overcome the disadvantages to using an RNN in a conventional manner, the disclosure proposes a system of deploying RNNs that makes it possible to perform or execute an inference process in a constant time increment when all but a fixed number of the elements of a data stream are available prior to inference time. In some embodiments, the disclosed system operates to cache a hidden state or states of an RNN after each data element arrives. A feature of an RNN is that it has a memory—the recurrent units within the network remember their state after each data element is processed. This remembered hidden state can affect the computation that occurs when the next element arrives.

In this way, the hidden remembered state of an RNN can serve as a representation of all previous data elements and may be used as the foundation for constructing a representation of the combination of past data and the current or most recent data element. The output of an RNN can be computed based on the hidden state of the recurrent units after all prior data elements and the current or most recent data element. This enables a reduction in the computation time complexity because only the last time-step of the unfolded RNN is executed when a prediction or inference operation is desired.

In some embodiments, the system or process calculates and stores hidden states in a low-latency key-value database that provides sub-millisecond retrieval time. This approach makes the hidden state of the recurrent network after all except the most recent element of the sequence available and accessible via a fast lookup operation at the time of a next inference process. The recurrent model is invoked to combine this hidden state with the most recent data point in real or near real-time, which is possible in a constant (fixed) time O(1) increment.

Consider an example implementation of the disclosed system and methodology in a real time bidding system used as part of serving advertising content to users of Internet browsers. In this example context, each Internet user generates a set of bid requests that arrive over a defined period and in a sequence. When a new request arrives for a particular user, the user's identifier (ID) (which is part of the request) is used to retrieve from a cache the hidden state of the RNN model after the prior requests for that user were input to and processed by the RNN. The cached hidden state is combined with the current request (input data) to execute the next iteration of the RNN processing and generate both a prediction (an inference result) and a new hidden state (as suggested by FIG. 1). The newly generated hidden state is then used to update the stored value(s) for the hidden state associated with that user-ID in the low-latency key-value cache.

Consider the case in which to two or more sequence elements (e.g., two bid requests with the same user identifier) are received within a time interval shorter than time required to execute and cache one iteration of the RNN. This case can be handled in at least two ways. If prediction accuracy is paramount, then the calculation of the prediction for the second new element can be delayed until the hidden state following the first new element is computed. If reduced latency is paramount, then the prediction for both elements can be computed using the hidden state cached prior to the arrival of either element, and offline code can be executed to cache the hidden state following the newly arrived sequence of elements. In either case, the system will "catch-up" and return to generating constant-time predictions as long as the average time between the arrival of each new element is greater than the constant time required to execute one iteration of the RNN.

After mapping or transforming input data into an appropriate format and collecting other relevant data, the set of data is ready to be passed to the prediction (inference) stage. The prediction stage will typically utilize one or more previously trained and evaluated models before deploying them as part of an overall system. The overall system disclosed herein is flexible in that it allows models from a variety of deep learning training frameworks to be deployed (Pytorch, Tensorflow, or MXNet, as non-limiting examples).

After model training and evaluation has been completed, the serialized model is passed to a machine learning compiler such as TVM, which performs further optimization and acceleration on the model to help ensure the model will run efficiently on most hardware. TVM provides a hardware-independent, domain-specific language to simplify operator implementation at the tensor index level. TVM offers scheduling primitives, such as multi-threading, tiling, and caching, to optimize a computation and more fully utilize hardware resources. In one sense, TVM takes a high-level graph specification of a program from a deep learning framework and generates lower-level optimized code which utilizes hardware specific implementations of operations.

In some embodiments, optimization is performed for multiple levels, from graph optimization, such as operator fusion, to scheduling and optimization for loop transformation and cache locality. Optimizations may be target dependent, meaning that optimization is done with respect to specific hardware. An example of this is turning data layout to NCHWc (an example of using data layout to improve spatial locality for a specific hardware target) to be optimized for Intel or ARM CPUs. Each optimization step may by itself have a relatively small impact on performance, but combined, the overall impact can be significant and provide a substantial performance improvement. After the optimization stages are completed, the model is passed through a compiler (such as LLVM) to output an efficient and optimized model.

To create a system that can respond to hundreds of thousands of inference requests with sub-10 millisecond (ms) latency and at sufficiently low cost, an embodiment may include an optimization of I/O bottlenecks that slow inference and could result in increased compute/power utilization. Modern CPUs have multiple layers of caching that may be leveraged to make an inference process faster and more computationally efficient. For example, if one compares the latency of the L1, L2 and L3 caches to main memory on a single 3 Ghz CPU, the caches are (at worst) respectively 70×, 25×, and 5× faster.

As an example, to utilize the speed advantage of the L3 cache, in some embodiments, the system ensures model weights remain resident in the L3 cache for faster access using a daemon process. This aspect of the disclosed system is important to achieving the speed and efficiency desired to make the application of deep learning to real-time bidding (RTB) and other applications practical.

Note that before deploying the models, it is advantageous that the model size be small enough to fit in the L3 cache (e.g., 20 Mb for a typical server). To reduce the extent to which this limit constrains the complexity of the models, model compression techniques, including pruning and removing the sparse weights, model quantization, model distillation, and other techniques may be applied prior to model deployment. In general, these approaches tend to keep the model below a predefined size without losing a significant amount of the prediction accuracy.

The "pinning" (i.e., the locking of code in memory) of optimized models into the L3 cache has downstream consequences with respect to how to optimally scale the system when (1) deploying multiple models and (2) handling changes in the number of predictions needed per second. In the disclosed system architecture, models may be pinned to CPUs, and the number of CPUs a particular model is assigned to may be scaled according to the demand for predictions from that model.

Note that at any given time, the disclosed system allows for more than one model to be in production. Depending on the memory footprint of models, multiple models can be assigned to the same CPU or processing element. After receiving an inference request and collecting the set of features, the inference request may be analyzed to determine which models should be applied based on a set of business logic for a particular user. For example, in the context of submitting a bid for an advertising opportunity, a particular opportunity (and hence submission of a bid in response to a bid request) might not be relevant to all users. One user might only be showing ads that are static 300×250 images. Another user might only be showing video ads. Thus, if an opportunity to bid on a static 300×250 ad opportunity arises, the request would only be routed to the first user's model based on the business logic of the users. In one embodiment, the business logic may be expressed as a set of rules, conditions, constraints, limits, or other suitable form.

The request is then routed to one of the prediction "workers" on which the required model is running (i.e., executing). Models may be continuously monitored, and metrics related to model performance, resource allocation and utilization, or prediction failures, as examples may be collected and audited. In this way, prediction "failures" are detected and addressed, and resources are scaled according to demand between predefined minimum and maximum capacities.

Figure 3:
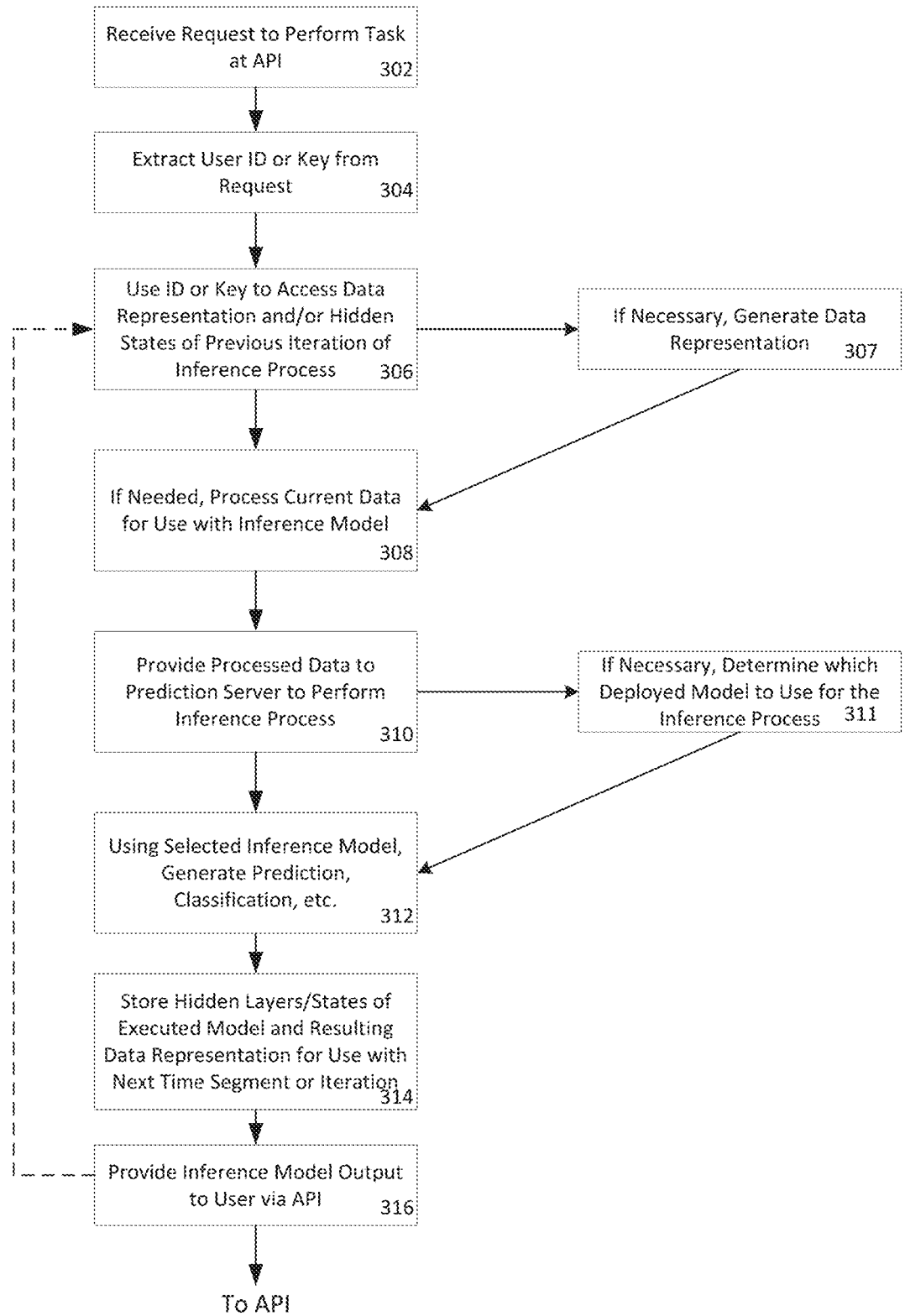
FIG. 3 is a flowchart or flow diagram illustrating a method or set of processes, operations, or functions that may be performed as part of implementing an embodiment of the disclosure.

FIG. 3 is a flowchart or flow diagram illustrating a method or set of processes, operations, or functions that may be performed as part of implementing an embodiment. As shown in the figure, in an example use case, a system or apparatus may implement one or more of the following functions or capabilities:

Receive a request for a task at an API (as suggested by step or stage 302). In response, the method may then;
  Extract a user identifier (ID) or other "key" from the request (304);
    Other examples of "keys" are URL or an IP address;
Based on the ID or key, access user-related data and/or bid-request related data, which may include features specific to the user or a web page URL (step 306);
  Such as the representation of a current item (e.g., a user feature) or element of data in a sequence;
  In some cases, this may include generating a representation for the data or feature (step 307);
  The accessed data may include the previously cached hidden state(s) of an executed inference model (representing the processing results of the model for previous data in the sequence and/or a representation of a previously submitted set of data);
Perform one or more data (pre)processing operations or processes for the current data (step 308), such as:
  Mapping;
  Filtering; or
  Transformations;
Provide the (pre)processed data to a Prediction Server (step 310);
  The Prediction Server may be hosted by or in communication with a Machine Learning Gateway or other system element;
Perform one or more optimization processes for an inference model, typically in advance of its use to enable it to be hosted by the system;
Determine which of multiple deployed models to use for the inference process (step 311);
  This may be based on application or execution of a set of rules or other form of business logic;
  Monitor the operation of the server to assist with load balancing, error correction, or other operational aspects;
  This may be determined based on the "key" extracted from the request (and may have been performed earlier in the described processing flow);
Provide the accessed data/features for the request to the determined inference model or models;
Use the determined model or models to generate a "prediction", inference, classification, or other form of model output based on the input data (step 312);
Return a hidden layer or state produced by the determined model to a ML Gateway or other element for storage as a feature of the user account for subsequent inference stages;
  In some embodiments, a ML Gateway may pass the hidden layer to the data storage or cache containing the stored features; and
Provide the model output (the "prediction") from the ML Gateway to the user via the API—in some cases, the model output or a hidden layer from the model may be provided to another model or data processing flow (step 316).

If desired, repeat the data/representation access retrieval steps and inference model application for the next time segment, data increment, or data set, and storage of model output and hidden states for each subsequent time segment, data increment, or data set in a sequence of data.

Although one or more embodiments have been described with reference to the serving of content to a viewer of a web page, there are other uses or contexts in which an embodiment may provide benefits. As non-limiting examples, a model output may be subject to business logic to determine a next event, to determine content to present, to determine how much in the way of resources to invest in causing an event, provided as an input to other decision process or model, or act as trigger for other process or event. For example, an RNN based model may be used to respond to news about a stock or commodity with low latency as part of an investment decision or reallocation of an investment.

Figure 4:
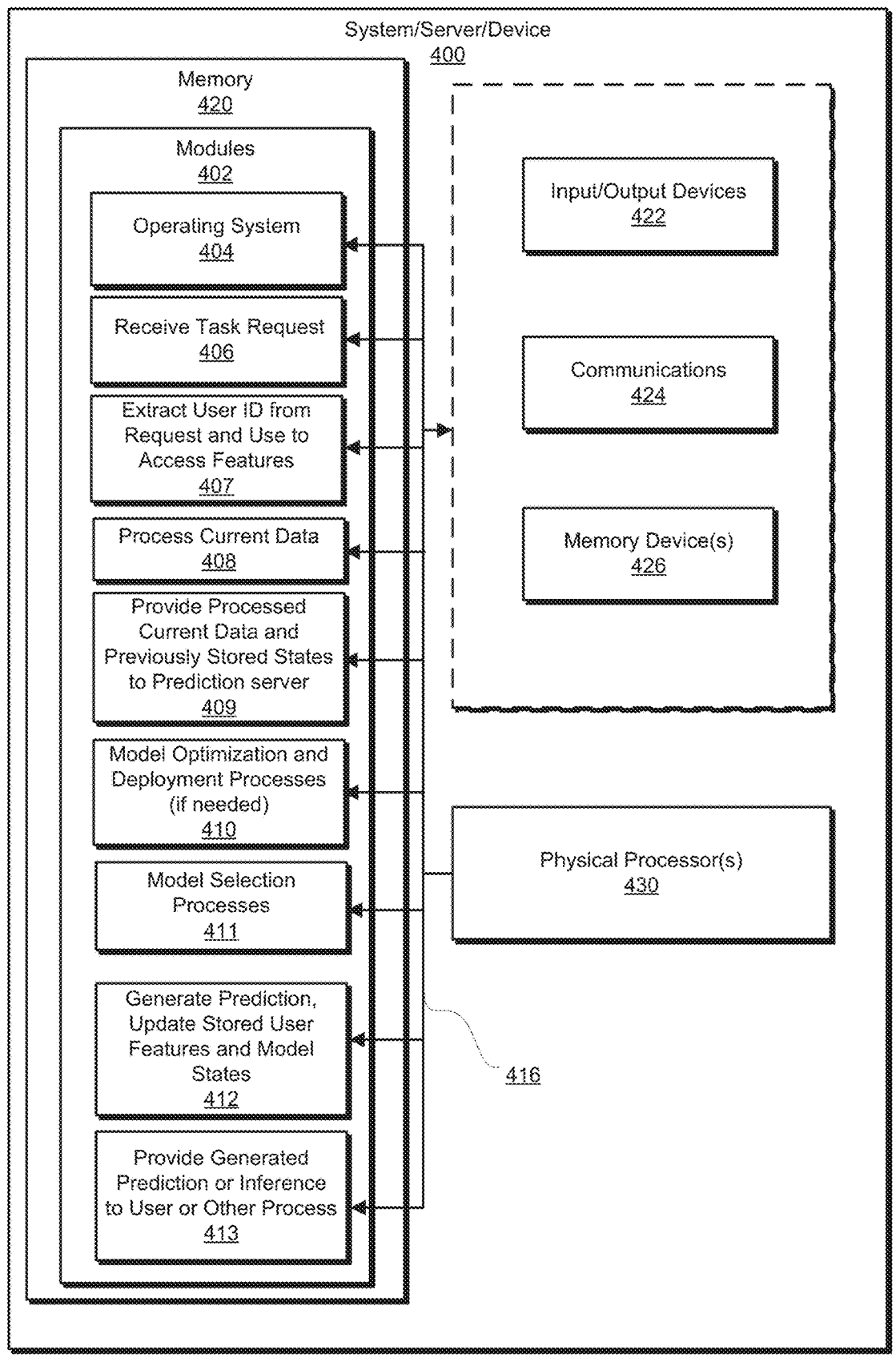
FIG. 4 is a diagram illustrating elements or components that may be present in a computer device, server, or system configured to implement a method, process, function, or operation in accordance with some embodiments.

FIG. 4 is a diagram illustrating elements or components that may be present in a computer device or system configured to implement a method, process, function, or operation in accordance with an embodiment of the system and methods disclosed herein. As noted, in some embodiments, the system and methods may be implemented in the form of an apparatus that includes a processing element and set of executable instructions. The executable instructions may be part of a software application and arranged into a software architecture.

In general, an embodiment may be implemented using a set of software instructions that are designed to be executed by a suitably programmed processing element (such as a GPU, CPU, TPU, QPU, microprocessor, processor, state machine, or controller, as non-limiting examples). In a complex application or system such instructions are typically arranged into "modules" with each such module typically performing a specific task, process, function, or operation. The entire set of modules may be controlled or coordinated in their operation by an operating system (OS) or other form of organizational platform.

Each application module or sub-module may correspond to a particular function, method, process, or operation that is implemented by the module or sub-module. Such function, method, process, or operation may include those used to implement one or more aspects of the disclosed systems, apparatuses, and methods.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language.

The modules may contain one or more sets of instructions for performing a method or function described with reference to the Figures, and the descriptions of the functions and operations provided in the specification. These modules may include those illustrated but may also include a greater number or fewer number than those illustrated. As mentioned, each module may contain a set of computer-executable instructions. The set of instructions may be executed by a programmed processor contained in a server, client device, network element, system, platform, or other component.

A module may contain instructions that are executed by a processor contained in more than one of a server, client device, network element, system, platform or other component. Thus, in some embodiments, a plurality of electronic processors, with each being part of a separate device, server, or system may be responsible for executing all or a portion of the software instructions contained in an illustrated module. Thus, although FIG. 4 illustrates a set of modules which taken together perform multiple functions or operations, these functions or operations may be performed by different devices or system elements, with certain of the modules (or instructions contained in those modules) being associated with those devices or system elements.

As shown in FIG. 4, system 400 may represent a server or other form of computing or data processing system, platform, or device. Modules 402 each contain a set of executable instructions, where when the set of instructions is executed by a suitable electronic processor or processors (such as that indicated in the figure by "Physical Processor(s) 430"), system (or server, platform, or device) 400 operates to perform a specific process, operation, function, or method. Modules 402 are stored in a memory 420, which typically includes an Operating System module 404 that contains instructions used (among other functions) to access and control the execution of the instructions contained in other modules. The modules 402 stored in memory 420 are accessed for purposes of transferring data and executing instructions by use of a "bus" or communications line 416, which also serves to permit processor(s) 430 to communicate with the modules for purposes of accessing and executing a set of instructions. Bus or communications line 416 also permits processor(s) 430 to interact with other elements of system 400, such as input or output devices 422, communications elements 424 for exchanging data and information with devices external to system 400, and additional memory devices 426.

In some embodiments, the modules 402 may comprise computer-executable software instructions that when executed by one or more electronic processors cause the processors or a system or apparatus containing the processors to perform one or more of the steps or stages of:

Receiving a request for a task at an API (as suggested by the instructions contained in module 406);
Extracting a user identifier (ID) or other "key" from the request (module 407);
Based on the ID or key, accessing user-related data and/or bid-request related data, which may include features specific to the user or a web page URL (module 407);
Such as the representation of a current item (e.g., a user feature) or element of data in a sequence;
The previously cached hidden state(s) of an executed inference model (representing the processing of the model for previous data in the sequence and/or a representation of previous data);
Performing one or more data (pre)processing operations or processes for the current data (module 408), such as:
Mapping;
Filtering; or
Transformations;
Providing the (pre)processed data to a Prediction Server (module 409);
The Prediction Server may be hosted by or in communication with a Machine Learning Gateway;
Performing one or more optimization processes for an inference model, typically in advance of its use to enable it to be hosted by the disclosed system (module 410);
Determining which of multiple deployed models to use for the prediction/inference process (module 411);
This may be based on a set of rules or other form of business logic;
Monitoring the operation of the Prediction Server to assist with load balancing, error correction, or other operational aspects;
This may be based on the "key" extracted from the request;
Providing the accessed features for the user account to the determined model or models;
Using the determined model or models to generate a "prediction", inference, classification, or other form of model output based on the input data (module 412);
Returning a hidden layer or state produced by the determined model to the ML Gateway for storage as a feature of the user account for subsequent inference stages;
In some embodiments, the ML Gateway will pass the hidden layer to the data storage or cache containing the stored features; and
Providing the model output (the "prediction") from the ML Gateway to the user via the API—in some cases, the model output or a hidden layer from the model may be provided to another model or data processing flow (module 413).

Figure 5:
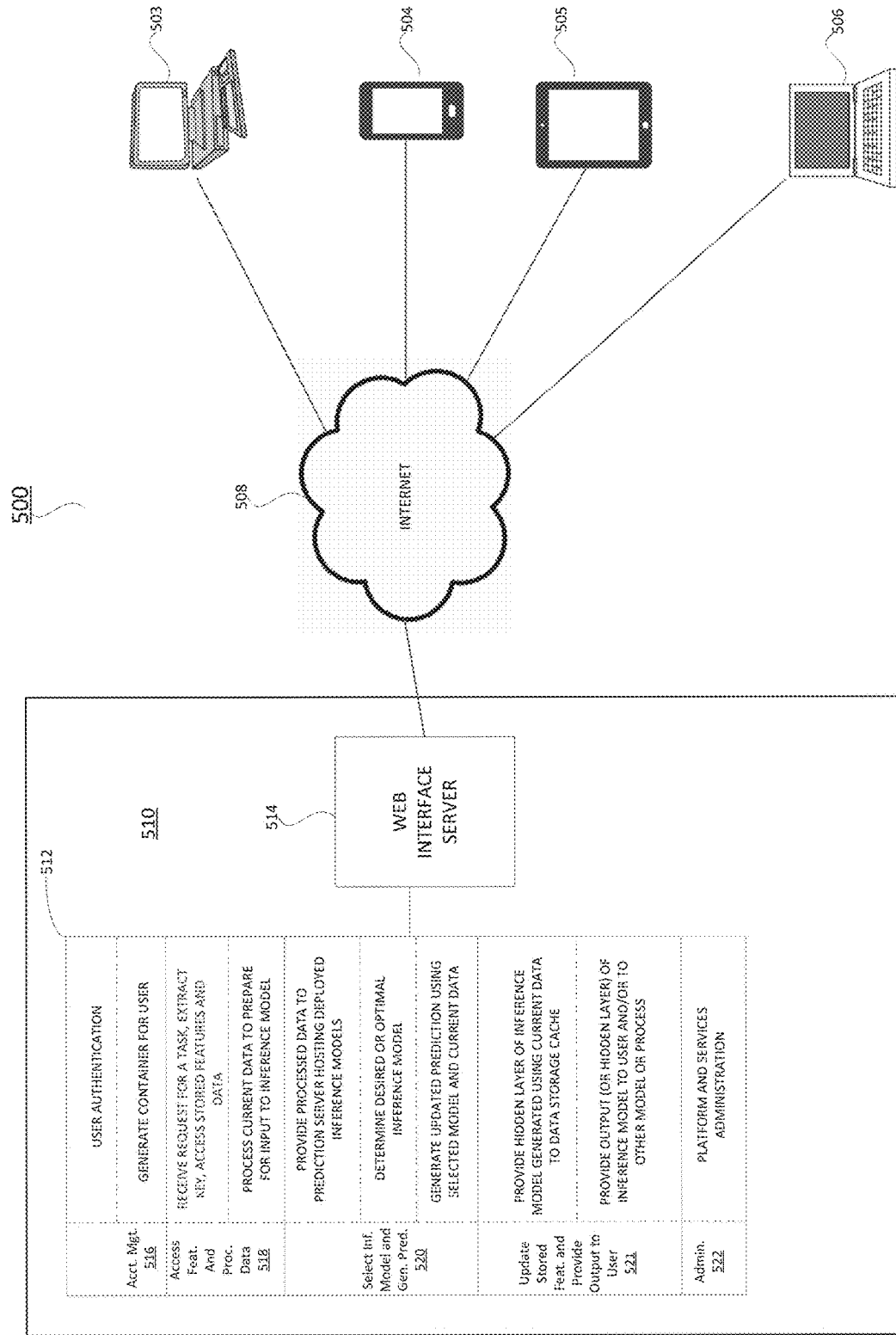
FIGS. 5, 6, and 7 are diagrams illustrating an architecture for a multi-tenant or SaaS platform that may be used in implementing an embodiment of the systems, apparatuses, and methods disclosed herein.
Figure 6:
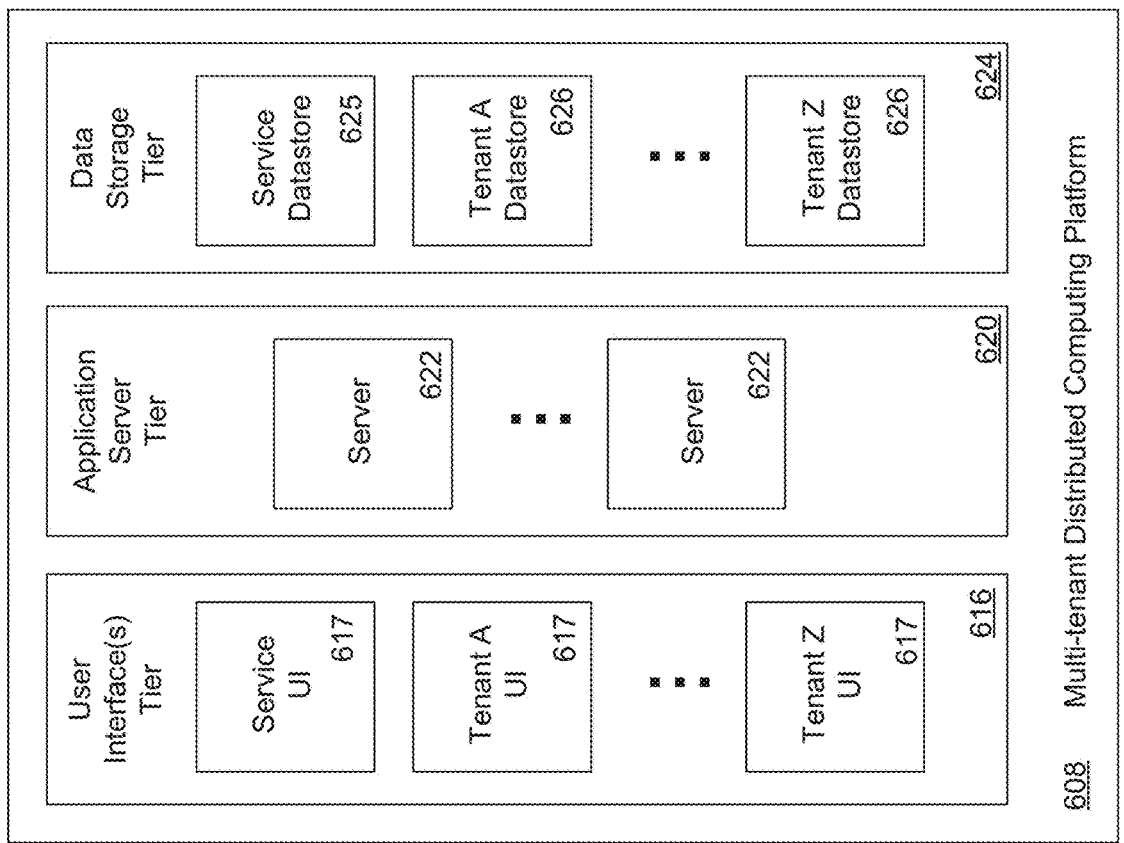
Figure 6:
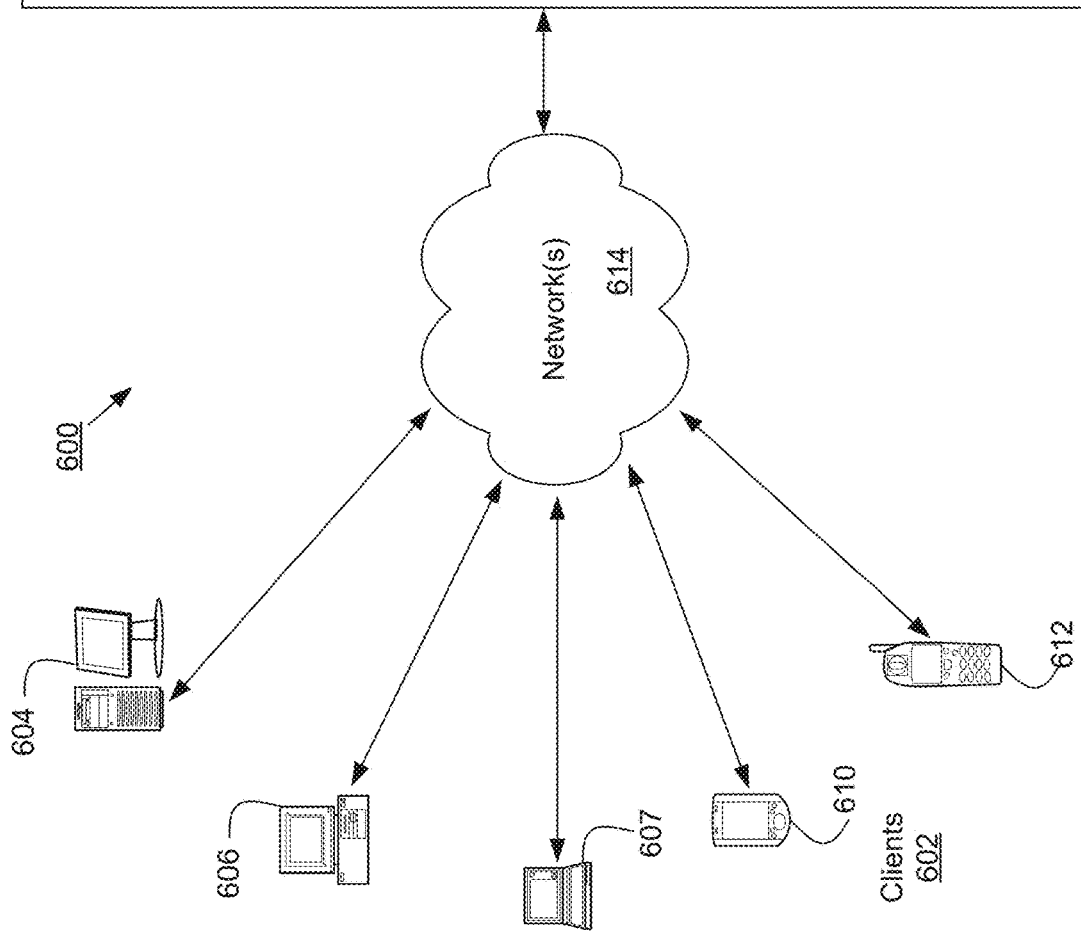
Figure 7:
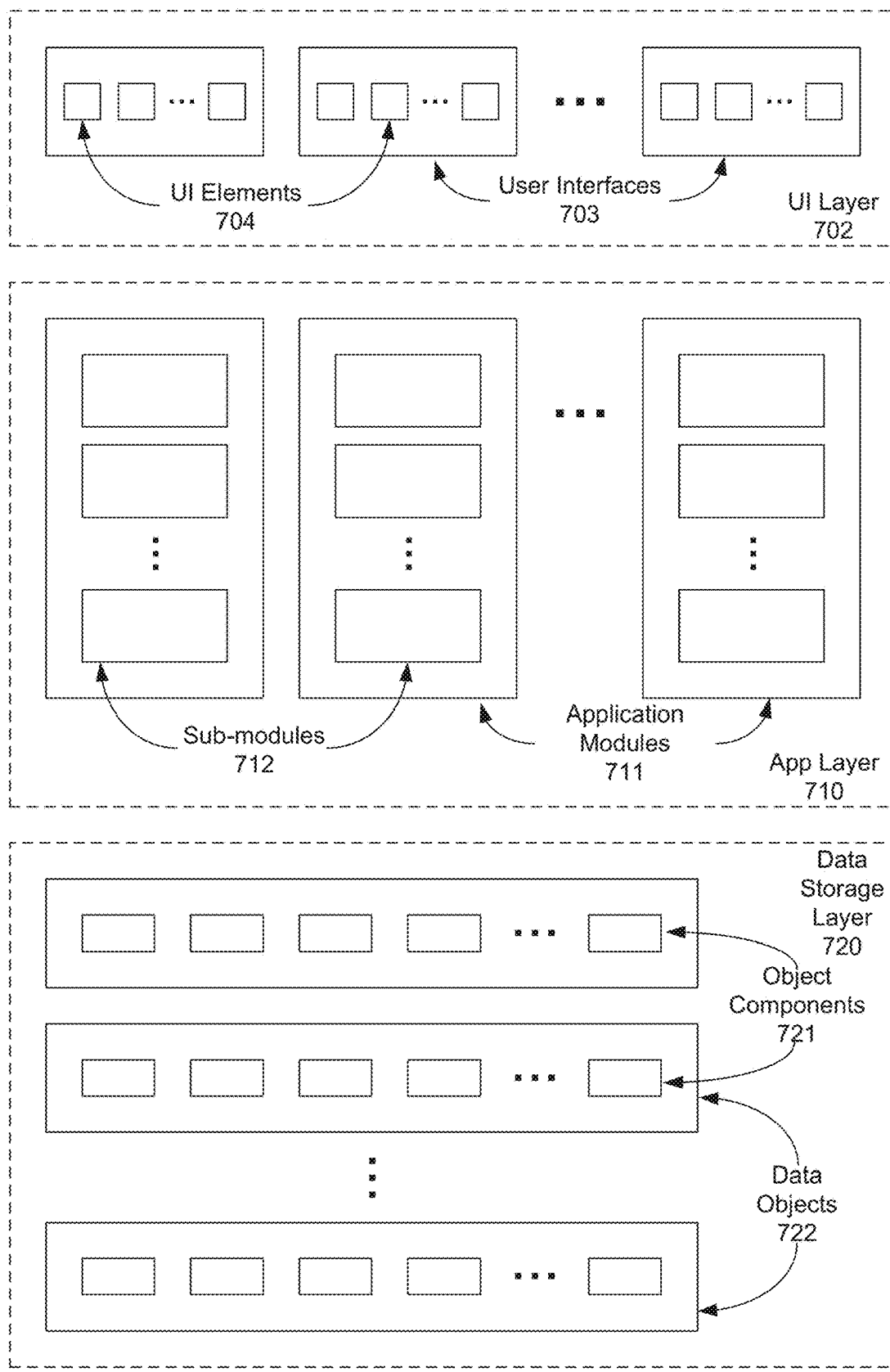

In some embodiments, the functionality and services provided by the system, apparatuses, and methods described herein may be made available to multiple users by accessing an account maintained by a server or service platform. Such a server or service platform may be termed a form of Software-as-a-Service (SaaS). FIGS. 5, 6, and 7 are diagrams illustrating an architecture for a multi-tenant or SaaS platform that may be used in implementing an embodiment of the systems, apparatuses, and methods disclosed herein. FIG. 5 is a diagram illustrating a SaaS system in which an embodiment may be implemented. FIG. 6 is a diagram illustrating elements or components of an example operating environment in which an embodiment may be implemented.

FIG. 7 is a diagram illustrating additional details of the elements or components of the multi-tenant distributed computing service platform of FIG. 6, in which an embodiment may be implemented.

In some embodiments, the system or services disclosed herein may be implemented as microservices, processes, workflows or functions performed in response to the submission of a set of input data. The microservices, processes, workflows or functions may be performed by a server, data processing element, platform, apparatus, or system. In some embodiments, the data analysis, inference, and other services may be provided by a service platform located "in the cloud". In such embodiments, the platform may be accessible through APIs and SDKs. The functions, processes and capabilities disclosed herein and with reference to one or more of the Figures may be provided as microservices within the platform. The interfaces to the microservices may be defined by REST and GraphQL endpoints. An administrative console may allow users or an administrator to securely access the underlying request and response data, manage accounts and access, and in some cases, modify the processing workflow or configuration.

Note that although FIGS. 5, 6, and 7 illustrate a multi-tenant or SaaS architecture that may be used for the delivery of business-related or other applications and services to multiple accounts/users, such an architecture may also be used to deliver other types of data processing services and provide access to other applications. For example, such an architecture may be used to provide one or more of the methods, processes, services, functions, or capabilities disclosed herein. Although in some embodiments, a platform or system of the type illustrated in the Figures may be operated by a 3rd party provider to provide a specific set of services or applications, in other embodiments, the platform may be operated by a provider and a different entity may provide the applications or services for users through the platform.

FIG. 5 is a diagram illustrating a system 500 in which an embodiment may be implemented or through which an embodiment of the services described herein may be accessed. In accordance with the advantages of an application service provider (ASP) hosted business service system (such as a multi-tenant data processing platform), users of the services described herein may comprise individuals, businesses, or organizations. A user may access the services using any suitable client, including but not limited to desktop computers, laptop computers, tablet computers, or smartphones. In general, any client device having access to the Internet may be used to provide data to the platform for processing and evaluation. A user interfaces with the service platform across the Internet 508 or another suitable communications network or combination of networks. Examples of client devices shown in the figure include desktop computers 503, smartphones 504, tablet computers 505, or laptop computers 506.

System 510, which may be hosted by a third party, may include a set of data analysis and other services to assist in providing the functions and capabilities disclosed herein 512, and a web interface server 514, coupled as shown in FIG. 5. It is to be appreciated that either or both the data analysis and other services 512 and the web interface server 514 may be implemented on one or more different hardware systems and components, even though represented as singular units in FIG. 5. Services 512 may include one or more functions or operations for the processing of sequential input data to enable the selection of an optimal prediction or inference model and updating of the hidden layers and output of the model.

As examples, in some embodiments, the set of functions, operations, or services made available through the platform or system 510 may include:
Account Management services 516, such as:
  a processor service to authenticate a user wishing to access a deployed inference or prediction model;
  a process or service to generate a container or instantiation of the data analysis and inference or prediction model services;
Access Features and Process Current Data services 518, such as:
  a process or service to receive a request for a task, extract a key or other form of user identifier (ID) from the request, and use the key or ID to access stored features and data associated with the user and/or a bid-request;
    the request may include current data from a sequential or temporal set of data generated or obtained from a user;
    the stored features and data may include the state of a hidden layer or layers of an inference model generated using previously provided data and/or a previously generated representation of user data;
  a process or service to process the current data to prepare it for input to an inference or prediction model;
    this processing may involve one or more of generating a data representation, mapping, filtering, or performing a transformation, as examples;
Select Inference Model and Generate Prediction services 520, such as:
  a process or service to provide the processed current data and stored features to a prediction server hosting deployed inference models;
  a processor service to determine a desired or optimal inference model, or identify and select a previously accessed one;
  a processor service to generate an updated prediction and/or data representation using the selected model and the current data;
Update Stored Features and Provide Model Output to User services 521, such as:
  a process or service to provide a hidden layer of the inference model generated using the current data to a data storage or cache to be accessed for the next "cycle" of the inference process;
    the hidden layer may be a representation of the user data (including the most current set of data) and/or a layer from the model after the input and processing of the current data;
  a processor service to provide the output (or hidden layer) of the inference model to the user and/or to another model or process;
Administration services 522, such as:
  a process or services to provide platform and services administration—for example, to enable the provider of the services and/or the platform to administer and configure the processes and services provided to users.

The platform or system shown in FIG. 5 may be hosted on a distributed computing system made up of at least one, but typically multiple, "servers." A server is a physical computer dedicated to providing data storage and an execution environment for one or more software applications or services intended to serve the needs of the users of other computers that are in data communication with the server, for instance via a public network such as the Internet. The server, and the services it provides, may be referred to as the "host" and the remote computers, and the software applications running on the remote computers being served may be referred to as "clients." Depending on the computing service(s) that a server offers it could be referred to as a database server, data storage server, file server, mail server, print server, or web server, as examples. A web server is most often a combination of hardware and the software that helps deliver content, commonly by hosting a website, to client web browsers that access the web server via the Internet.

FIG. 6 is a diagram illustrating elements or components of an example operating environment 600 in which an embodiment may be implemented. As shown, a variety of clients 602 incorporating and/or incorporated into a variety of computing devices may communicate with a multi-tenant service platform 608 through one or more networks 614. For example, a client may incorporate and/or be incorporated into a client application (e.g., software) implemented (executed) at least in part by one or more of the computing devices. Examples of suitable computing devices include personal computers, server computers 604, desktop computers 606, laptop computers 607, notebook computers, tablet computers or personal digital assistants (PDAs) 610, smart phones 612, cell phones, and consumer electronic devices incorporating one or more computing device components (such as one or more electronic processors, microprocessors, central processing units (CPU), or controllers). Examples of suitable networks 614 include networks utilizing wired and/or wireless communication technologies and networks operating in accordance with any suitable networking and/or communication protocol (e.g., the Internet).

The distributed computing service/platform (which may also be referred to as a multi-tenant data processing platform) 608 may include multiple processing tiers, including a user interface tier 616, an application server tier 620, and a data storage tier 624. The user interface tier 616 may maintain multiple user interfaces 617, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with specific user requirements (e.g., represented by "Tenant A UI", . . . , "Tenant Z UI" in the figure, and which may be accessed via one or more APIs).

The default user interface may include user interface components enabling a tenant to administer the tenant's access to and use of the functions and capabilities provided by the service platform. This may include accessing tenant data, launching an instantiation of a specific application, or causing the execution of specific data processing operations, as examples. Each application server or processing tier 622 shown in the figure may be implemented with a set of computers and/or components including computer servers and processors, and may perform various functions, methods, processes, or operations as determined by the execution of a software application or set of instructions. The data storage tier 624 may include one or more data stores, which may include a Service Data store 625 and one or more Tenant Data stores 626. Data stores may be implemented with any suitable data storage technology, including structured query language (SQL) based relational database management systems (RDBMS).

Service Platform 608 may be multi-tenant and may be operated by an entity to provide multiple tenants with a set of business-related or other data processing applications, data storage, and specific functionality. For example, the applications and functionality may include providing web-based access to the processes used by a business to provide services to end-users, thereby allowing a user with a browser and an Internet or intranet connection to view, enter, process, or modify certain types of information. Such functions or applications are typically implemented by one or more modules of software code/instructions that are maintained on and executed by one or more servers 622 that are part of the platform's Application Server Tier 620. As noted with regards to FIG. 5, the platform system shown in FIG. 6 may be hosted on a distributed computing system/platform made up of at least one, but typically multiple, "servers."

As mentioned, rather than build and maintain such a platform or system themselves, a business may utilize systems provided by a third party. A third party may implement a business system/platform as described above in the context of a multi-tenant platform, where individual instantiations of a business' data processing workflow (such as the data analysis and evaluation services and processing described herein) are provided to users, with each business or set of users representing a tenant of the platform. One advantage to such multi-tenant platforms is the ability for each tenant to customize their instantiation of the data processing workflow to that tenant's specific business needs or operational methods. Each tenant may be a business or entity that uses the multi-tenant platform to provide business services and functionality to multiple users.

FIG. 7 is a diagram illustrating additional details of the elements or components of the multi-tenant distributed computing service platform of FIG. 6, in which an embodiment may be implemented. The software architecture shown in FIG. 7 represents an example of an architecture which may be used to implement an embodiment. In general, an embodiment may be implemented using a set of software instructions that are designed to be executed by a suitably programmed processing element (such as a CPU, microprocessor, processor, controller, or computing device, as examples). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 7 is a diagram illustrating additional details of the elements or components 700 of a multi-tenant distributed computing service platform, in which an embodiment may be implemented. The example architecture includes a user interface layer or tier 702 having one or more user interfaces 703. Examples of such user interfaces include graphical user interfaces and application programming interfaces (APIs). Each user interface may include one or more interface elements 704. Users may interact with interface elements to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks, and dialog boxes. Application programming interfaces may be local or remote and may include interface elements such as parameterized procedure calls, programmatic objects, and messaging protocols.

The application layer 710 may include one or more application modules 711, each having one or more sub-modules 712. Each application module 711 or sub-module 712 may correspond to a function, method, process, or operation that is implemented by the module or sub-module (e.g., a function or process related to providing data processing and services to a user of the platform). Such function, method, process, or operation may include those used to implement one or more aspects of the disclosed system and methods, such as for one or more of the processes or functions described with reference to the Figures:

Receiving a request for a task at an API;
        Extracting a user identifier (ID) or other "key" from the request;
        Based on the ID or key, accessing user-related data, which may include features specific to the user and/or a bid-request;
            Such as the representation of a current item or element of data in a sequence, or other data relevant to a user (demographic data for example);
            The previously cached hidden states of an executed inference model (representing the processing of the model for previous data in the sequence and/or a data representation for previously generated user data);
    Performing one or more data (pre)processing operations or processes for the current data, such as:
        Mapping;
        Filtering;
        Transformations;
    Providing the (pre)processed data to a Prediction Server;
        The Prediction Server may be hosted by a Machine Learning (ML) Gateway;
    Performing one or more optimization processes for an inference model, typically in advance of its use to enable it to be hosted by the Prediction System;
    Determining which of multiple models to use for the inference process;
        This may be the result of executing or applying a form of business logic, such as a rule-set, decision process, or condition, as examples;
    Monitoring the operation of the Prediction Server to assist with load balancing, error correction, or similar operational considerations;
        Providing the accessed features for the user account to the determined model or models;
    Using the determined model or models to generate a "prediction", classification, or other form of model output based on the input data;
    Returning a hidden layer or state produced by the determined model to the ML Gateway for storage as a feature of the user account for subsequent inference stages;
        In some embodiments, the ML Gateway will pass the hidden layer to the data storage or cache containing the stored features;
            the hidden layer may be a representation of the user data (including the most current set of data) and/or a layer from the model after the input and processing of the current data; and
    Providing the model output (the "prediction") from the ML Gateway to the user via the API—in some cases, the model output or a hidden layer from the model may be provided to another model or data processing flow.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 622 of FIG. 6) may include each application module. Alternatively, different application servers may include different sets of application modules. Such sets may be disjoint or overlapping.

The data storage layer 720 may include one or more data objects 722 each having one or more data object components 721, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 5, 6, and 7 are not intended to be limiting examples. Further environments in which an embodiment may be implemented in whole or in part include devices (including mobile devices), software applications, systems, apparatuses, networks, SaaS platforms, IaaS (infrastructure-as-a-service) platforms, or other configurable components that may be used by multiple users for data entry, data processing, application execution, or data review.

Embodiments of the disclosure may be implemented in the form of control logic using computer software in a modular or integrated manner. Based on the disclosure and teachings provided herein, a person of ordinary skill in the art will recognize other ways and/or methods to implement an embodiment using hardware, software, or a combination of hardware and software.

In some embodiments, certain of the methods, models, processes, or functions disclosed herein may be embodied in the form of a trained neural network or other form of model derived from a machine learning algorithm. The neural network or model may be implemented by the execution of a set of computer-executable instructions and/or represented as a data structure. The instructions may be stored in (or on) a non-transitory computer-readable medium and executed by a programmed processor or processing element. The set of instructions may be conveyed to a user through a transfer of instructions or an application that executes a set of instructions over a network (e.g., the Internet). The set of instructions or an application may be utilized by an end-user through access to a SaaS platform, self-hosted software, on-premise software, or a service provided through a remote platform.

A trained neural network, trained machine learning model, or other form of decision or classification process may be used to implement one or more of the methods, functions, processes, or operations disclosed herein. Note that a neural network or deep learning model may be characterized in the form of a data structure in which are stored data representing a set of layers, with each layer containing a set of nodes, and with connections (and associated weights) between nodes in different layers. The neural network or model operates on an input to provide a decision, prediction, inference, or value as an output.

In general terms, a neural network may be viewed as a system of interconnected artificial "neurons" or nodes that exchange messages between each other. The connections have numeric weights that are "tuned" during a training process, so that a properly trained network will respond correctly when presented with an image, pattern, or set of data. In this characterization, the network consists of multiple layers of feature-detecting "neurons", where each layer has neurons that respond to different combinations of inputs from the previous layers.

Training of a network is performed using a "labelled" dataset of inputs in an assortment of representative input patterns (or datasets) that are associated with their intended output response. Training uses general-purpose methods to iteratively determine the weights for intermediate and final feature neurons. In terms of a computational model, each neuron calculates the dot product of inputs and weights, adds a bias, and applies a non-linear trigger or activation function (for example, using a sigmoid response function).

Machine learning (ML) is used to analyze data and assist in making decisions in multiple industries. To benefit from using machine learning, a machine learning algorithm is applied to a set of training data and labels to generate a "model" which represents what the application of the algorithm has "learned" from the training data. Each element (or example) in the form of one or more parameters, variables, characteristics, or "features" of the set of training data is associated with a label or annotation that defines how the element should be classified by the trained model. A machine learning model can predict or infer an outcome based on the training data and labels and be used as part of decision process. When trained, the model will operate on a new element of input data to generate the correct label or classification as an output.

The disclosure includes the following clauses and embodiments:

1. A method of implementing an inference process for a low latency application, wherein for each of a plurality of time segments, the method comprises:
   obtaining data corresponding to a current time segment;
   retrieving a previously generated state of an inference model used for the low latency application, wherein the previously generated state is a result of executing the inference model for an earlier time segment;
   executing the inference model using the obtained data corresponding to the current time segment and the retrieved previously generated state;
   providing an output of the executed inference model to a user; and
   storing at least part of the state of the executed inference model in a storage element for retrieval during a subsequent time segment.
2. The method of clause 1, wherein a representation for the data corresponding to a current time segment is obtained by generating the representation using a pre-trained model.
3. The method of clause 1, wherein the inference model is a recurrent neural network-based model.
4. The method of clause 1, wherein the low latency application is responding to a bid-request for serving content to a viewer of a web page.
5. The method of clause 1, wherein the data corresponding to the current time segment comprises one or more of viewer data and contextual data, the contextual data comprising data regarding a web page viewed by the viewer.
6. The method of clause 1, wherein the data corresponding to a current time segment comprises a key used to retrieve the previously generated layer of the inference model.
7. The method of clause 1, further comprising aggregating the data corresponding to the current time segment with other data prior to executing the inference model.
8. The method of clause 1, further comprising using the output of the executed model as an input to a decision process, the decision process comprising one or more of a resource allocation, a selection of content to present to a viewer, or a decision whether to initiate an event or action.
9. A system for implementing an inference process for a low latency application, comprising:
   one or more electronic processors configured to execute a set of computer-executable instructions; and
   one or more non-transitory electronic data storage media containing the set of computer-executable instructions, wherein when executed, the instructions cause the one or more electronic processors to
     obtain data corresponding to a current time segment;
     retrieve a previously generated state of an inference model used for the low latency application, wherein the previously generated state is a result of executing the inference model for an earlier time segment;
     execute the inference model using the obtained data corresponding to the current time segment and the retrieved previously generated state;
     provide an output of the executed inference model to a user; and
     store at least part of the state of the executed inference model in a storage element for retrieval during a subsequent time segment.
10. The system of clause 9, wherein the inference model is a recurrent neural network-based model.
11. The system of clause 9, wherein the low latency application is responding to a bid-request for serving content to a viewer of a web page.
12. The system of clause 9, wherein the data corresponding to the current time segment comprises one or more of viewer data and contextual data, the contextual data comprising data regarding a web page viewed by the viewer.
13. The system of clause 9, wherein the data corresponding to a current time segment comprises a key used to retrieve the previously generated layer of the inference model.
14. The system of clause 9, wherein the instructions further cause the one or more electronic processors to use the output of the executed model as an input to a decision process, the decision process comprising one or more of a resource allocation, a selection of content to present to a viewer, or a decision whether to initiate an event or action.
15. One or more non-transitory computer-readable media comprising a set of computer-executable instructions for implementing an inference process for a low latency application, that when executed by one or more programmed electronic processors, cause the processors to
   obtain data corresponding to a current time segment;
   retrieve a previously generated state of an inference model used for the low latency application, wherein the previously generated state is a result of executing the inference model for an earlier time segment;
   execute the inference model using the obtained data corresponding to the current time segment and the retrieved previously generated state;
   provide an output of the executed inference model to a user; and store at least part of the state of the executed inference model in a storage element for retrieval during a subsequent time segment.

16. The one or more non-transitory computer-readable media of clause 15, wherein the inference model is a recurrent neural network-based model.

17. The one or more non-transitory computer-readable media of clause 15, wherein the inference model is used as part of an application responding to a bid-request for serving content to a viewer of a web page.

18. The one or more non-transitory computer-readable media of clause 15, wherein the data corresponding to the current time segment comprises one or more of viewer data and contextual data, the contextual data comprising data regarding a web page viewed by the viewer.

19. The one or more non-transitory computer-readable media of clause 15, wherein the data corresponding to a current time segment comprises a key used to retrieve the previously generated layer of the inference model.

20. The one or more non-transitory computer-readable media of clause 15, wherein the instructions further cause the one or more electronic processors to use the output of the executed model as an input to a decision process, the decision process comprising one or more of a resource allocation, a selection of content to present to a viewer, or a decision whether to initiate an event or action.

Any of the software components, processes or functions described in this application may be implemented as software code to be executed by a processor using any suitable computer language such as Python, Java, JavaScript, C++, or Perl using conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus and may be present on or within different computational apparatuses within a system or network. Further, the set of instructions may be conveyed to a user through a transfer of instructions or an application that executes a set of instructions (such as over a network, e.g., the Internet). The set of instructions or an application may be utilized by an end-user through access to a SaaS platform or a service provided through such a platform.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HDDVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely intended to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

As used herein in the specification, figures, and claims, the term "or" is used inclusively to refer items in the alternative and in combination.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the disclosure is not limited to the embodiments described above or depicted in the drawings, and various embodiments and modifications can be made without departing from the scope of the claims below.

What is claimed is:

1. A method of implementing an inference process for a low latency application, wherein for each of a plurality of time segments, the method comprises:
    obtaining data corresponding to a current time segment for a low latency application;
    retrieving a previously generated hidden layer of a Recurrent Neural Network (RNN) used to implement an inference process for the low latency application, wherein the previously generated hidden layer of the RNN is a result of executing the RNN for an earlier time segment and the hidden layer is retrieved from a low latency key value store;
    executing the RNN using the obtained data corresponding to the current time segment and the retrieved previously generated hidden layer;
    providing an output of the executed RNN to a user as an output of the low latency application; and
    storing at least part of the hidden layer of the executed RNN in the low latency key value store for retrieval during a subsequent time segment.

2. The method of claim 1, wherein a representation for the data corresponding to a current time segment is obtained by generating the representation using a pre-trained model.

3. The method of claim 1, wherein the low latency application is responding to a bid-request for serving content to a viewer of a web page.

4. The method of claim 1, wherein the data corresponding to the current time segment comprises one or more of viewer data and contextual data, the contextual data comprising data regarding a web page viewed by the viewer.

5. The method of claim 1, wherein the data corresponding to a current time segment comprises a key used to retrieve the previously generated state of the RNN.

6. The method of claim 1, further comprising aggregating the data corresponding to the current time segment with other data prior to executing the RNN.

7. The method of claim 1, further comprising using the output of the RNN as an input to a decision process, the decision process comprising one or more of a resource allocation, a selection of content to present to a viewer, or a decision whether to initiate an event or action.

8. A system for implementing an inference process for a low latency application, comprising:
    one or more electronic processors configured to execute a set of computer-executable instructions; and
    one or more non-transitory electronic data storage media containing the set of computer-executable instructions, wherein when executed, the instructions cause the one or more electronic processors to
        obtaining data corresponding to a current time segment for a low latency application;
        retrieving a previously generated hidden layer a Recurrent Neural Network (RNN) used to implement an inference process for the low latency application, wherein the previously generated hidden layer of the RNN is a result of executing the RNN for an earlier time segment and the hidden layer is retrieved from a low latency key value store;
        executing the RNN using the obtained data corresponding to the current time segment and the retrieved previously generated hidden layer;
        providing an output of the executed RNN to a user as an output of the low latency application; and
        storing at least part of the hidden layer of the executed RNN in the low latency key value store for retrieval during a subsequent time segment.

9. The system of claim 8, wherein the low latency application is responding to a bid-request for serving content to a viewer of a web page.

10. The system of claim 8, wherein the data corresponding to the current time segment comprises one or more of viewer data and contextual data, the contextual data comprising data regarding a web page viewed by the viewer.

11. The system of claim 8, wherein the data corresponding to a current time segment comprises a key used to retrieve the previously generated layer of the RNN.

12. The system of claim 8, wherein the instructions further cause the one or more electronic processors to use the output of the RNN as an input to a decision process, the decision process comprising one or more of a resource allocation, a selection of content to present to a viewer, or a decision whether to initiate an event or action.

13. One or more non-transitory computer-readable media comprising a set of computer-executable instructions for implementing an inference process for a low latency application, that when executed by one or more programmed electronic processors, cause the processors to obtaining data corresponding to a current time segment for a low latency application;

retrieving a previously generated hidden layer a Recurrent Neural Network (RNN) used to implement an inference process for the low latency application, wherein the previously generated hidden layer of the RNN is a result of executing the RNN for an earlier time segment and the hidden layer is retrieved from a low latency key value store, executing the RNN using the obtained data corresponding to the current time segment and the retrieved previously generated hidden layer;

providing an output of the executed RNN to a user as an output of the low latency application; and storing at least part of the hidden layer of the executed RNN in the low latency key value store for retrieval during a subsequent time segment.

14. The one or more non-transitory computer-readable media of claim 13, wherein the inference model is used as part of an application responding to a bid-request for serving content to a viewer of a web page.

15. The one or more non-transitory computer-readable media of claim 13, wherein the data corresponding to the current time segment comprises one or more of viewer data and contextual data, the contextual data comprising data regarding a web page viewed by the viewer.

16. The one or more non-transitory computer-readable media of claim 13, wherein the data corresponding to a current time segment comprises a key used to retrieve the previously generated layer of the RNN.

17. The one or more non-transitory computer-readable media of claim 13, wherein the instructions further cause the one or more electronic processors to use the output of the executed RNN as an input to a decision process, the decision process comprising one or more of a resource allocation, a selection of content to present to a viewer, or a decision whether to initiate an event or action.

* * * * *